Dec. 15, 1925.　　　F. A. SEWARD　　　1,566,234
HOT TIN LIFTER
Filed Feb. 21, 1925
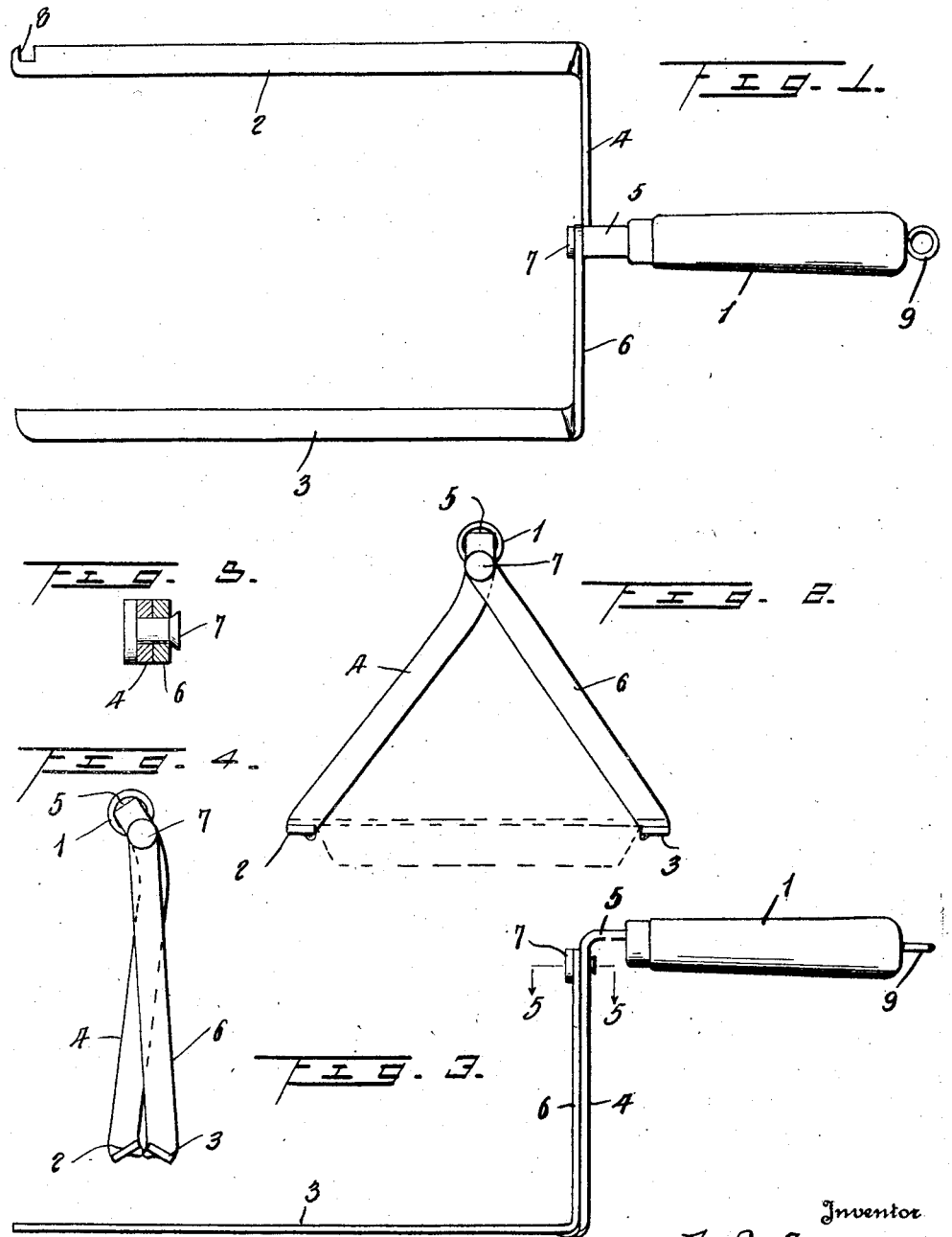
Inventor
F. A. Seward,
By [signature] Attorney Patented Dec. 15, 1925.

1,566,234

UNITED STATES PATENT OFFICE.

FRANK A. SEWARD, OF BANTAM, CONNECTICUT.

HOT-TIN LIFTER.

Application filed February 21, 1925. Serial No. 10,869.

*To all whom it may concern:*

Be it known that I, FRANK A. SEWARD, a citizen of the United States, residing at Bantam, in the county of Litchfield and State of Connecticut, have invented certain new and useful Improvements in Hot-Tin Lifters; and I do hereby declare the following to be a full, clear, and exact description of the invention, such as will enable others skilled in the art to which it appertains to make and use the same.

This invention relates to devices for lifting bread, cake, pie and other pans from ovens, and has for one of its objects the provision of a novel device of this character which may be easily and quickly applied to or removed from a pan, from which the pan cannot become accidentally detached while it is being placed in or removed from an oven or while it is being transferred from an oven to a table or from the latter to the former, and which shall be simple, durable and inexpensive of manufacture.

With the above and other objects in view, the invention consists of the construction, combination and arrangement of parts hereinafter fully described and claimed, and illustrated in the accompanying drawings, wherein:

Figure 1 is a top plan view of the pan lifter with the jaws thereof in opened position, Figure 2 is a view in end elevation of the pan lifter applied to a pan, Figure 3 is a view in side elevation of the pan lifter, Figure 4 is a view in end elevation of the pan lifter with the jaws thereof closed, and Figure 5 is a detailed sectional view taken on the plane indicated by the line 5—5 of Figure 3.

Corresponding and like parts are referred to in the following description, and designated in the several views of the accompanying drawing, by similar reference characters.

The pan lifter comprises a handle 1 and jaws 2 and 3. The jaws 2 and 3 are of considerable length, and are located below and have a substantially parallel relation with respect to the handle 1. An arm 4 extending downwardly from the handle 1 and fixed thereto by means of a shank 5, is secured at its lower end to the rear end of the jaw 2. A downwardly extending arm 6 is pivoted at 7 to the arm 4 and is secured at its lower end to the rear end of the jaw 3. The jaw 2, arm 4 and shank 5 are preferably made from a strip of steel or any other suitable metal, as are the jaw 3 and arm 6. That portion of the arm 4 located below the pivot 7 of the arm 6 is downwardly and laterally inclined with respect to that portion thereof located above the pivot 7. The arm 6 is straight throughout its entire length. The jaws 2 and 3 are inclined downwardly and outwardly, and the jaw 2 is notched at its forward end to provide a hook 8. At its rearward end, the handle 1 is provided with an eye 9 to permit the lifter to be suspended from a nail or the like when not in use.

When the lifter is not in use but supported by the handle 1, the jaws 2 are in closed position, as shown in Figure 4. To open the jaws 2 and 3 so as to permit the lifter to be engaged with a pan it is desired to remove from an oven, it is only necessary, due to the pivotal connection of the jaws and the formation of the upper end of the arm 4, to place the jaws upon the bottom of the oven and press downwardly on the handle 1. The jaws 2 and 3 are spread apart far enough to permit them to be shoved along the bottom of the oven at opposite sides of the pan. After the jaws 2 and 3 have been positioned at the opposite sides of the pan, the device is lifted to bring the jaws into contact with the flange or rolled edge of the pan. The pan may now be readily removed from the oven and placed upon a table or other support. Due to their angular relation, the jaws 2 and 3 will have such contact with the flange or rolled edge of the pan as to prevent the latter from slipping from the lifter. Due to the pivotal connection between the arms 4 and 6, and the formation of the upper end of the arm 4, the jaws 2 and 3 will when bearing a weight be caused to move in the direction of each other. The hook 8 permits the lifter to be used to draw pans from the back to the front of the oven in order to facilitate the easy application of the lifter to the pan.

It should be understood that the drawing is merely illustrative and does not pretend to give exact proportions. Furthermore, the said drawing is illustrative of a preferred construction, it being my expectation that various changes and modifications may be made without departing from the spirit and scope of the invention.

What is claimed is:—

A pan lifter comprising two bars, each bar having angularly disposed end portions, one of said end portions being pivoted to the other end portion, the latter end portion being extended rearwardly to constitute a handle shank, and the remainder of the bars extending forwardly to provide arms to engage a pan.

In testimony whereof I affix my signature.

FRANK A. SEWARD.